US009852477B2

(12) United States Patent
Palmer et al.

(10) Patent No.: US 9,852,477 B2
(45) Date of Patent: Dec. 26, 2017

(54) METHOD AND SYSTEM FOR SOCIAL MEDIA SALES

(71) Applicant: Kaptivating Hospitality LLC, Los Angeles, CA (US)

(72) Inventors: Michael C. Palmer, Los Angeles, CA (US); Steven A. Tulk, Coto de Caza, CA (US)

(73) Assignee: Kaptivating Technology LLC, Los Angeles, CA (US)

( * ) Notice: Subject to any disclaimer, the term of this patent is extended or adjusted under 35 U.S.C. 154(b) by 0 days.

(21) Appl. No.: 14/192,358

(22) Filed: Feb. 27, 2014

(65) Prior Publication Data

US 2014/0289006 A1 Sep. 25, 2014

Related U.S. Application Data

(60) Provisional application No. 61/803,612, filed on Mar. 20, 2013.

(51) Int. Cl.
*G06Q 50/00* (2012.01)
*G06Q 30/02* (2012.01)
*G06F 17/30* (2006.01)
*G06Q 30/06* (2012.01)

(52) U.S. Cl.
CPC ....... *G06Q 50/01* (2013.01); *G06F 17/30401* (2013.01); *G06F 17/30598* (2013.01); *G06F 17/30867* (2013.01); *G06Q 30/0204* (2013.01); *G06Q 30/0256* (2013.01); *G06Q 30/0269* (2013.01); *G06Q 30/0633* (2013.01)

(58) Field of Classification Search
None
See application file for complete search history.

(56) References Cited

U.S. PATENT DOCUMENTS

| | | | | |
|---|---|---|---|---|
| 7,478,078 B2 * | 1/2009 | Lunt | ...................... | G06Q 30/02 |
| 7,689,682 B1 * | 3/2010 | Eldering | ................ | G06Q 40/00 709/218 |
| 8,055,664 B2 * | 11/2011 | Baluja | ...................... | G06N 5/02 705/14.7 |
| 8,145,679 B1 * | 3/2012 | Baluja | ............... | G06F 17/30035 707/713 |
| 8,239,418 B1 * | 8/2012 | Baluja | ............... | G06F 17/30035 707/713 |
| 8,266,007 B2 * | 9/2012 | Calabria | ................ | G06Q 10/10 705/26.1 |
| 8,306,922 B1 * | 11/2012 | Kunal | ................... | G06Q 30/02 705/319 |

(Continued)

OTHER PUBLICATIONS

Gundecha, P.; et al.; Mining Social Media: A Brief Introduction; 2012; Informs, Tutorials in Operations Research; pp. 1-17.*

(Continued)

*Primary Examiner* — Gurkanwaljit Singh
(74) *Attorney, Agent, or Firm* — ARC IP Law, PC; Joseph J. Mayo (57) ABSTRACT

A system and method to match product supply with demand by identifying potential customers on social media. The system comprising a database, a social search module, a lead analysis module, a customer engagement module, a transaction module, a blog integration module and an inventory classification module, where the database and the modules are all communicatively coupled to each other.

29 Claims, 11 Drawing Sheets

(56) References Cited

U.S. PATENT DOCUMENTS

| | | | | |
|---|---|---|---|---|
| 8,311,950 B1* | 11/2012 | Kunal | G06Q 30/0201 | 705/319 |
| 9,129,027 B1* | 9/2015 | Hamedi | G06F 17/30867 | |
| 2006/0004789 A1* | 1/2006 | Lunt | G06Q 30/02 | |
| 2006/0218577 A1* | 9/2006 | Goodman | G06Q 30/02 | 725/32 |
| 2007/0106551 A1* | 5/2007 | McGucken | G06Q 30/02 | 705/7.29 |
| 2007/0226248 A1* | 9/2007 | Darr | G06Q 10/10 | |
| 2008/0045236 A1* | 2/2008 | Nahon | H04W 4/12 | 455/456.1 |
| 2009/0144075 A1* | 6/2009 | Flinn | G06N 5/048 | 705/318 |
| 2010/0217670 A1* | 8/2010 | Reis | G06Q 30/02 | 705/14.53 |
| 2010/0235307 A1* | 9/2010 | Sweeney | G06N 5/02 | 706/12 |
| 2011/0093336 A1* | 4/2011 | Calabria | G06Q 10/10 | 705/14.53 |
| 2011/0125550 A1* | 5/2011 | Erhart | G06Q 30/0201 | 705/7.29 |
| 2011/0191417 A1* | 8/2011 | Rathod | G06Q 30/02 | 709/204 |
| 2011/0314006 A1* | 12/2011 | Sweeney | G06F 17/2785 | 707/723 |
| 2012/0179642 A1* | 7/2012 | Sweeney | G06F 17/2785 | 706/55 |
| 2012/0278387 A1* | 11/2012 | Garcia | G06Q 50/01 | 709/204 |
| 2012/0310747 A1* | 12/2012 | Calabria | G06Q 10/10 | 705/14.67 |
| 2012/0324027 A1* | 12/2012 | Vaynblat | G06Q 50/01 | 709/206 |
| 2013/0073388 A1* | 3/2013 | Heath | G06Q 30/02 | 705/14.53 |
| 2013/0080526 A1* | 3/2013 | Gill | G06Q 10/10 | 709/204 |
| 2013/0097180 A1* | 4/2013 | Tseng | G06F 17/30722 | 707/748 |
| 2013/0124538 A1* | 5/2013 | Lee | G06F 17/3053 | 707/749 |
| 2013/0124542 A1* | 5/2013 | Lee | G06F 17/30392 | 707/751 |
| 2013/0144899 A1* | 6/2013 | Lee | G06F 17/30392 | 707/759 |
| 2013/0268357 A1* | 10/2013 | Heath | H04L 63/00 | 705/14.53 |
| 2014/0006135 A1* | 1/2014 | Vergun | G06Q 30/0226 | 705/14.27 |
| 2015/0154646 A1* | 6/2015 | Mishra | G06Q 50/24 | 705/3 |
| 2015/0161606 A1* | 6/2015 | Lee | G06Q 20/405 | 705/44 |

OTHER PUBLICATIONS

Gundecha, P.; et al.; Mining Social Media: A Brief Introduction; 2012; Informs; Tutorials in Operations Research; pp. 1-17.*

* cited by examiner

METHOD AND SYSTEM FOR SOCIAL MEDIA SALES

FIELD OF THE INVENTION

The present invention relates generally to social media sales systems and more particularly, a system to match product supply with demand by identifying potential customers on social media and determining buying intent of each potential customer.

BACKGROUND

There have been many efforts to use social media to sell merchandise, but these efforts have been haphazard and inconsistent. Usually, a merchant, either runs a sale on a particular product or promote other products by giving away excess inventory that they cannot sell on their social media web site. Disadvantageously, only people who subscribe to the merchant's social media site are ever informed about the product. This minimizes the sales potential for the merchant and does not allow them to target new potential buyers unless the offer is spread "by word of mouth" through social media.

Other efforts have been the standard advertising model of using the social media sites as a way of identifying a particular target audience based on age, gender and the usual demographics found in traditional marketing campaigns. All of these efforts have are lacking the ability to use the available information in a real-time effort Therefore, there is a need for a system to match product supply with demand by identifying potential customers on social media and determining buying intent of each potential customer.

SUMMARY

A system is provided to match product supply with demand using social media using a database attached to a social search module, a lead analysis module, a customer engagement module, a transaction module, a blog integration module and an inventory classification module. Each of the modules are also in communication with each other in addition to the database. The modules can exist on a single computing system or as discrete modules remotely located from each other. Each of the modules, either local or remote, can define, store and retrieve attributes pertaining to potential customers, such as, for example, demographics, product affinity, products, and customer interaction with the system over time, in the database.

Each of the modules comprises non-transitory instructions executable on a processor for intent based marketing, transaction processing or both intent based marketing and transaction processing. More specifically, the social search module uses keyword analysis, natural language processing algorithms, statistical methods of classification and assignment of taxonomy categories. The keyword analysis, statistical methods and the natural language processing can use Bayesian classifier and Naive Bayesian classifier algorithms to search various social media sites to identify customers seeking products, services or both product and services according to a taxonomy.

The system further comprises instructions to dynamically generate a message in response to a social media post based on available information and attributes stored in the database, such as, for example a demographic attribute, a previous post analysis attribute, and a previous customer interaction attribute, to engage a potential customer. Previous customer interactions are determined and classified from a customer profile from one or more than one social media website. Additionally, the dynamically generated message can have a unique URL that links the potential customer to the transaction module, or an interface customized to a specific buying affinity, demographic or customer request.

The customer engagement module analyzes the stored attributes to match product supply with customer demand and dynamically generate messages and/or propositions to the customer based on the customer's previous interactions.

The transaction module supports interfaces branded to a specific merchant and has a shopping cart and a customizable user interface. The transaction module can also dynamically generate landing pages based on stored customer attributes and generate analytics, display reports, display user created landing pages, integrate with additional social media platforms and integrate with third-party product platforms to extend the system's capabilities. The transaction module can also generate buying affinity based landing pages and interfaces embedded within social media. The transaction module can operate as a standalone website, a landing page, and within the social media site depending on how the user would like to interact with potential customers.

The social search module searches various social media sites using keywords entered by the user looking for potential customers. Working with the lead analysis module the keywords are used to analyze potential customer leads found by the search module and rank the strength of the lead using an algorithm, such as, for example, a Bayesian Classifier, Semantic Classifier, and natural language processing. The engagement module can generate a manual response message or an automatic response message to the customer leads returned by the search module. Additionally, the engagement module communicates with customer leads to improve engagement by transmitting product related offers to the customer leads based on attributes identified by the engagement module.

The customer interface can display various formats to the customer using customer buying affinity determined by the engagement module.

The engagement module can analyze the stored data and further refine the likelihood of a customer's intent to purchase the user's products or services.

The blog integration module can insert system transaction modules into third party websites and blogs through keyword linking. Additionally, the blog integration module can automatically convert keywords stored in the database to HTML anchors with hover-overs and/or tool-tip type balloons in the third-party website. The hover-overs and tool-tip type balloons can present customer incentives to purchase, such as, for example a text, an image or a video.

The inventory classification module can use keyword analysis, natural language processing algorithms, statistical methods of classification and assignment of taxonomy categories, where the natural language processing algorithms can be Bayesian classifiers and Naive Bayesian classifiers to search third party product supply interfaces to identify and classify products and services according to a taxonomy.

There is also provided a method to match product supply with demand using social media by: a) accessing the system described above, setting system preferences, searching for keywords related to a product or a service, storing the search results in a database, analyzing the search results, relating search results to relevant inventory available and dynamically generating messages to select customers. Additionally, stored search results can be filtered and/or displayed in a quick list for the user. The user can manually or automatically respond to posts displayed from the search results. Also, customer demographics for a selected filter and a date range can be displayed to the user.

BRIEF DESCRIPTION OF THE DRAWINGS

These and other features, aspects and advantages of the present invention will become better understood with regard to the following description, appended claims, and accompanying figures where:

DETAILED DESCRIPTION

The present invention overcomes the limitations of the prior art by providing a system that integrates intent based marketing modules and transaction processing modules within a single system. The system monitors social media for potential customers seeking product and service buying advice. When the system determines that a potential customer is searching for a product or service it has to offer, the system sends them a dynamically generated message about the product or service, based on their interests and previous interactions with the system. The message includes pertinent details of the product or service offer and also provides a way for the potential customer to immediately make a purchase. Optionally, the system also provides a means for the user to send a manually entered message.

The system comprises transaction processing tools and an interface to match product supply with demand by identifying potential customers on social media. The system safely communicates and conducts secure transactions with those potential customers. The system transacts the sale of products and/or services within social media, the web or local application interfaces based on the potential customer's affinity, interests and demographic information.

No other system currently available provides relevant messages, products and services offerings to transact sales with social media customers based on a pre-determined intent to buy. The advantages of combining marketing with transaction modules in a single system provide a merchant with a real-time ability to target more potential customers and make more sales than by using separate systems, where the pertinent information may not be available due to incompatibilities.

Implementation of embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any system, any device or part of a system or device disclosed in this disclosure will be determined by its intended use.

As used in this disclosure, except where the context requires otherwise, the term "comprise" and variations of the term, such as "comprising", "comprises" and "comprised" are not intended to exclude other additives, modules, integers or steps.

In the following description, specific details are given to provide a thorough understanding of the embodiments. However, it will be understood by one of ordinary skill in the art that the embodiments may be practiced without these specific detail. Well-known circuits, structures and techniques may not be shown in detail in order not to obscure the embodiments. For example, circuits may be shown in block diagrams in order not to obscure the embodiments in unnecessary detail.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage may represent one or more devices for storing data, including read-only memory (ROM), random access memory (RAM), magnetic disk storage mediums, optical storage mediums, flash memory devices and/or other non-transitory machine readable mediums for storing information. The term "machine readable medium" includes, but is not limited to portable or fixed storage devices, optical storage devices, wireless channels and various other non-transitory mediums capable of storing, comprising, containing, executing or carrying instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). One or more than one processor may perform the necessary tasks in series, distributed, concurrently or in parallel. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc and are also referred to as an interface, where the interface is the point of interaction with software, or computer hardware, or with peripheral devices.

Various embodiments provide a system to match product supply with demand by identifying potential customers on social media. One embodiment of the present invention provides a system to match product supply with demand by identifying potential customers on social media. In another embodiment, there is provided a method for using the system. The system and method will now be disclosed in detail.

Figure 1:
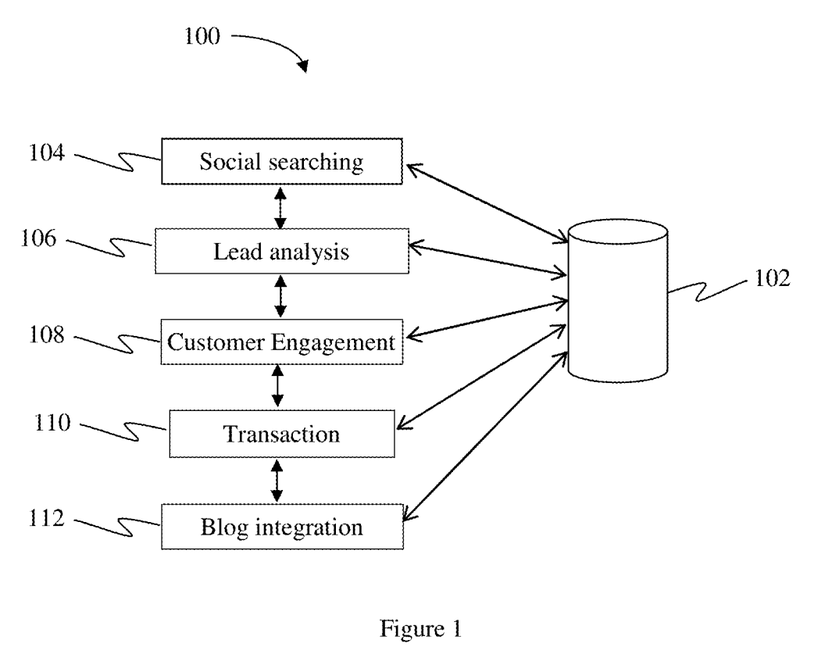
FIG. 1 is a diagram of a shown a diagram of a system to match product supply with demand by identifying potential customers on social media, according to one embodiment.

Referring now to FIG. 1, there is shown a diagram of a system 100 to match product supply with demand by identifying potential customers on social media, according to one embodiment. As can be seen, the system 100 comprises a database 102, a social search module 104 to match supply and demand; a lead analysis module 106 for keyword and natural language processing; a customer engagement module 108 for manual and automated response to leads based on custom or user defined templates, customer demographics, and previous interactions with the system; a transaction module 110 for affinity based landing pages and interfaces embedded within social media; and a blog integration module 112 for keyword highlighting and hover overs. Each of the modules 104-112 is communicatively coupled to the database 102. Additionally, the modules 104-112 are communicatively coupled to one another. In a preferred embodiment, all of the modules 104-112 are contained in a single system. Optionally, the modules 104-112 can be discrete from each other.

The system 100 integrates intent based marketing modules and transaction processing modules within a single system. Additionally, the system 100 can use keyword analysis, natural language processing algorithms and statistical methods of classification, such as, for example Bayesian or Naive Bayesian classifiers to search various social media services and identify customers seeking products or services such as a hotel. For example, a potential customer may post "Where should I stay in Las Vegas?" on a social media website. The system 100 engages the potential customer with a dynamically generated message in response to the post based on any available information such as demographic attributes, analysis of their previous posts, and data from the customer's previous interactions with the system stored in the database 102 or determined from the potential customer's profile on one or more than one social media website. The dynamically generated message can comprise a unique URL that links the potential customer to the transaction module 110 of the system 100 that can comprise an interface, such as a landing page, that can be customized to the potential customer's specific affinity, demographics and request. Optionally, the system also provides a means for the user to send a manually entered message.

The system 100 collects, defines, stores and retrieves attributes pertaining to potential customers. The attributes can comprise demographics, product affinity, products, and customer interaction with the system 100 over time. The collected attributes are stored the database 102. The system 100 uses the attributes to match product supply with customer demand and dynamically generate a message or a proposition to present to the customer based on the customer's previous interactions with the system 100. For example, if the customer has been reviewing prices but has not committed to a purchase, the system will recognize that behavior and dynamically generate a message or offer based on a price incentive. Similarly, if the customer has been reviewing product availability but has not committed to a purchase, the system can dynamically generate a message based upon availability. Optionally, the system also provides a means for the user to send a manually entered message.

Each module 104-112 can be connected to every other module using a variety of standards based methods. Preferably, the methods used include HTTPS, HTTP POST, AJAX, JSON, XML, REST, SQL queries and direct database access. The modules 104-112 are communicatively coupled to each other by exchanging, storing and retrieving data between each module 104-112 and the database 102 that stores the information from each module 104-112. For example, data stored in the database 102 can be passed from the search module 104 to the lead analysis module 106. The engagement module 108 can post relevant responses to leads using data from the lead analysis module 106. The dynamically generated messages are sent to potential customers based upon attributes collected by the system 100 over a period of time. The attributes can comprise demographic, affinity and behavior of the customer. The dynamically generated messages can comprise a unique embedded URL link for each lead. The URL can link to back and connect the potential customer to the transaction module 110. The transaction module 110 uses the data from the unique URL to identify the customer and to provide customized content and product offerings for that specific customer from the available data.

The transaction module 110 can comprise additional interfaces required to connect to various proprietary third party product supply interfaces. Additionally, the transaction module 110 comprises built-in customization features to support interfaces branded to a merchant. Also, the system 100 can generate dynamic landing pages based on customer's attributes. The system 100 can also generate analytics, display reports, display user created landing pages, integrate with additional social media platforms and with additional product platforms to extend the system's 100 capabilities depending upon merchant requirements. The system 100 can also be expanded to include additional product suppliers, social media networks, aggregators and reporting tools. Additionally, transaction module 110 can display ancillary products at checkout based on customer affinity, demographics etc.

The search module 104 comprises non-transitory instructions executable on a processor to search various social media sites, such as, for example, Twitter®, Facebook® and Instagram® using keywords entered by the user for potential customer leads. Potential customer leads are returned and passed can be transmitted to the lead analysis module 106 and stored in the database 102.

The lead analysis module 106 comprises non-transitory instructions executable on a processor to analyze potential customer leads found by the search module and 104 and can rank the strength of the lead using an algorithm. The algorithm can be selected from the group consisting of Bayesian Classifiers, Semantic Classifiers, and natural language processing.

The engagement module 108 comprises non-transitory instructions executable on a processor to generate a manual response message, an automatic response message or both a manual and an automated response message to the customer leads returned by the search module 104. The response message can be based on custom or user defined templates, customer demographics, and previous interactions with the system 100.

The engagement module 108 also comprises instructions to communicate with customer leads and improve engagement by transmitting product related offers to the customer leads based on attributes identified by the engagement module 108. The attributes can comprise demographic information, post history, responses to previous posts, and a history of interactions with the transaction module 110.

The transaction module 110 comprises non-transitory instructions executable on a processor to generate buying affinity based landing pages and interfaces embedded within social media. The transaction module 100 comprises a shopping cart module and a customizable user interface module. A customer interface can be configured to display various formats to the customer using customer affinity determined by the engagement module 108. The transaction module 110 can operate as a standalone website, a landing page, or within the social media site. Customer interaction with the transaction module 110 can be stored in the database. The engagement module 108 comprises instructions to analyze the stored data and further refine the likelihood of a customer's intent to purchase the user's products or services.

The blog integration module 112 comprises non-transitory instructions executable on a processor to insert system 100 transaction modules 110 into third party websites and blogs through keyword linking. For example, if the owner of a third-party website, or blog, adds a transaction module 110 link code (typically a single line of code) to the third-party website, keywords stored in the database 102 can automatically be converted to HTML anchors with hover-over or tool-tip type balloons in the third-party website. The hover-overs or balloons can comprise customer incentives to purchase in the form of text, images and video. The hover-overs or balloons can also comprise a link to a user's transaction site. The hover-overs or balloons can also comprise an entire transaction site generated by the system 100.

Additionally, the system 100 can be configured to track how a customer visits and leaves a site before purchasing. This information can be collected to determine if the customer is considering a purchase for example. For example, if a customer looks at prices and then leaves, but returns later to look some more or possibly looking at availability and revisiting the site later. Analysis of this information can indicate a customer's intent so that the system can dynamically generate messages that are more specific regarding offers, availability, price or product to convert the customer into a buyer.

Also, the system 100 can analyze customer's previous posts or posts after the initial post for buying advice to understand if the customer has been in the market searching for a period of time, or determining the trajectory of how the customer's search is progressing so that more specific messages can be dynamically generated.

Figure 2:
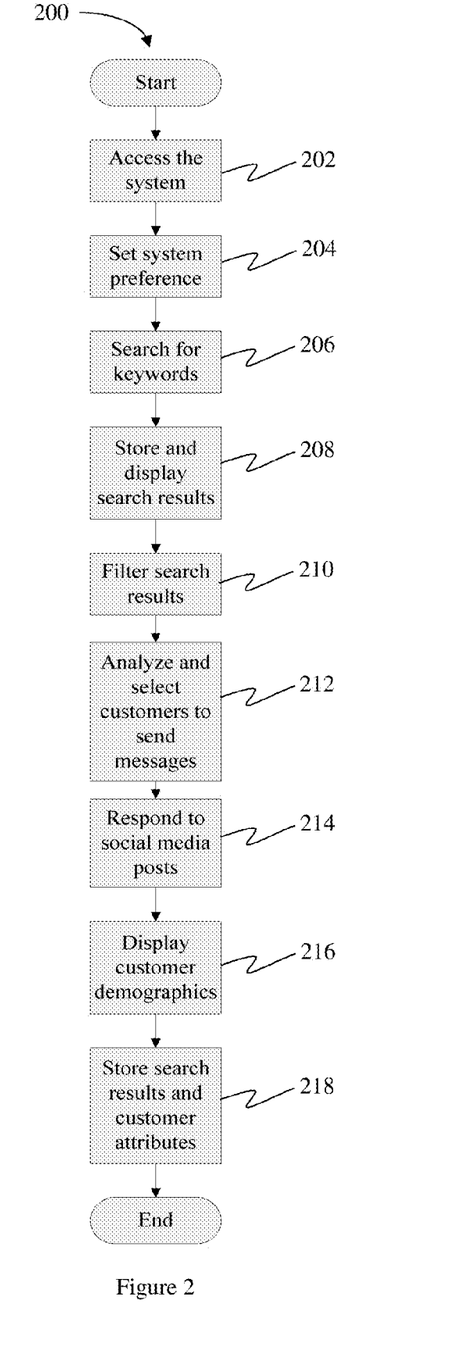
FIG. 2 is a flowchart diagram of some steps of a method for using the system of FIG. 1.

Referring now to FIG. 2, there is shown a flowchart diagram of some steps of a method for using the system of FIG. 1. First, a user accesses 202 the system. Then, the user can set system preferences 204. Next, the user can perform a search for keywords 206 related to a product or service. Then, the results for the search are stored 208 in the database 102 and displayed in a quick list. Next, the user can filter 210 the search results by clicking on the filter button on the user interface. Then, the user can select 212 specific customers to save or send dynamically generated messages. Next, the user can respond 214 manually, automatically or both manually and automatically to posts displayed from the search results. Then, the user can display 216 customer demographics for a selected filter and a date range. Finally, the user can store the search results and the customer attributes 218 in the database 102.

Figure 3:
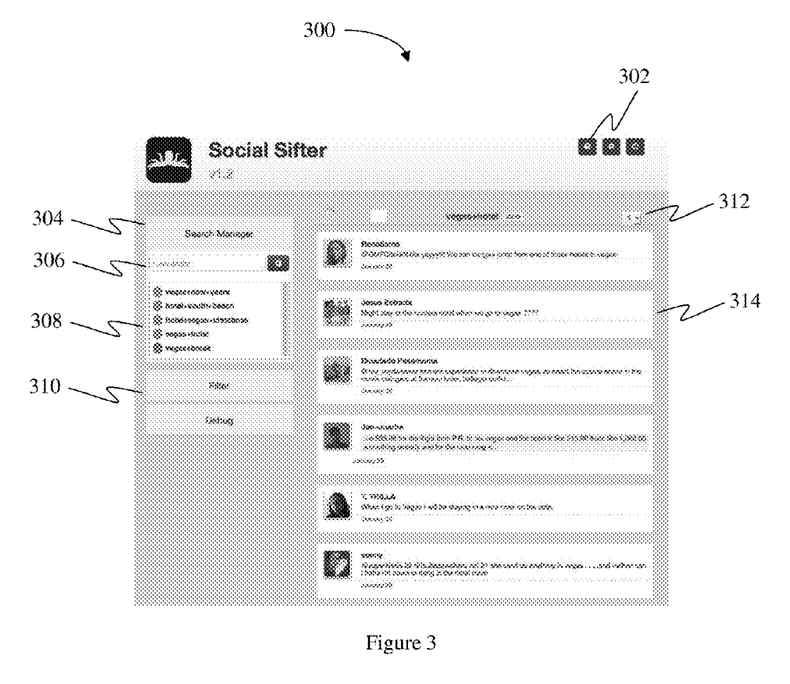
FIG. 3 is a screenshot of a user interface useful for the system of FIG. 1.

Referring now to FIG. 3, there is shown a screenshot of a user interface 300 useful for the system of FIG. 1. The user interface 300 comprises a plurality of functional areas for the user to use the system 100, including a settings 302 module, a search manager 304 module, a filter box 310 module, a page selector and a post listing 314 module. The search manager 304 module comprises a search box 306 and a list box 308. The search box 306 provides the user an area to enter keywords to search through social media posts that are relevant to the product or services that the user has to offer for sale. The list box 308 comprises previously searches that the user has conducted and saved in the database 102. These previous searches can be used to automate the dynamic message generation on a daily basis to new potential customers that are not stored in the database 102.

Figure 4:
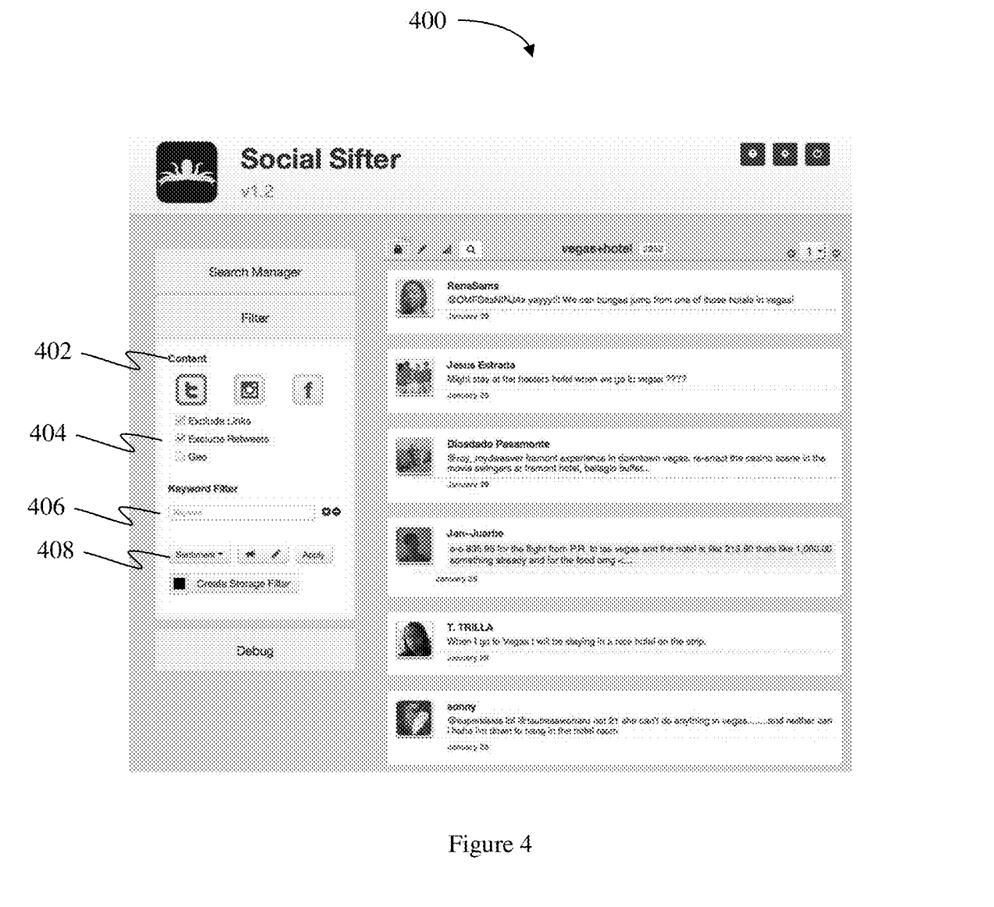
FIG. 4 is a screenshot of the user interface showing filter options.

Referring now to FIG. 4, there is shown a screenshot of the user interface 300 showing a filter options 400. When selected by the user, the filter box 310 module comprises a content filter 402 module with options checkboxes 404, a keyword filter 406 module can be used to filter the search results even further, and a sentiment selection 408 module. The content filter displays options that provide the user with the social media sites that the user can search. Optionally, the social media sites can be set in the settings 302 module. The options checkboxes 404 can comprise exclusion and geo-location selections and other optional selections that can be set by the user using the settings 302 module. The keyword filter 406 module can be used to refine the search results further. This allows the user to discover more relevant customers for the user's products or services. The sentiment selection 408 module, discussed below, is a mechanism to mark posts with a customer's buying affinity. This information can be stored, tracked and analyzed to determine if there are any barriers to market penetration for the user's products services or to alter the dynamically generated messages to increase buyer affinity. For example, a reluctant customer affinity can be changed by offering a discount or other special for the user's products or services.

Figure 5:
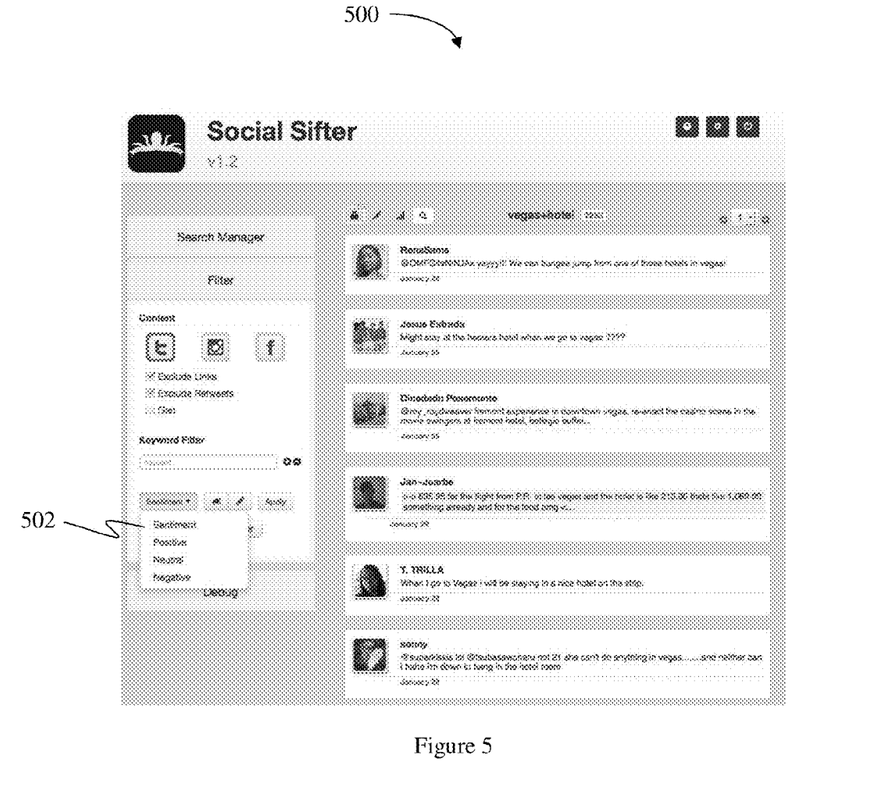
FIG. 5 is a screenshot of the user interface showing customer intent options.

Referring now to FIG. 5, there is shown a screenshot of the user interface 300 showing customer intent selector 502. As can be seen the sentiment selection 408 module can comprise various customer affinity ratings, such as, for example, positive, neutral and negative that can be selected using the customer intent selector 502. As will be understood by those with skill in the art with reference to this disclosure, other affinity ratings can be used and implemented in the system 100.

Figure 6:
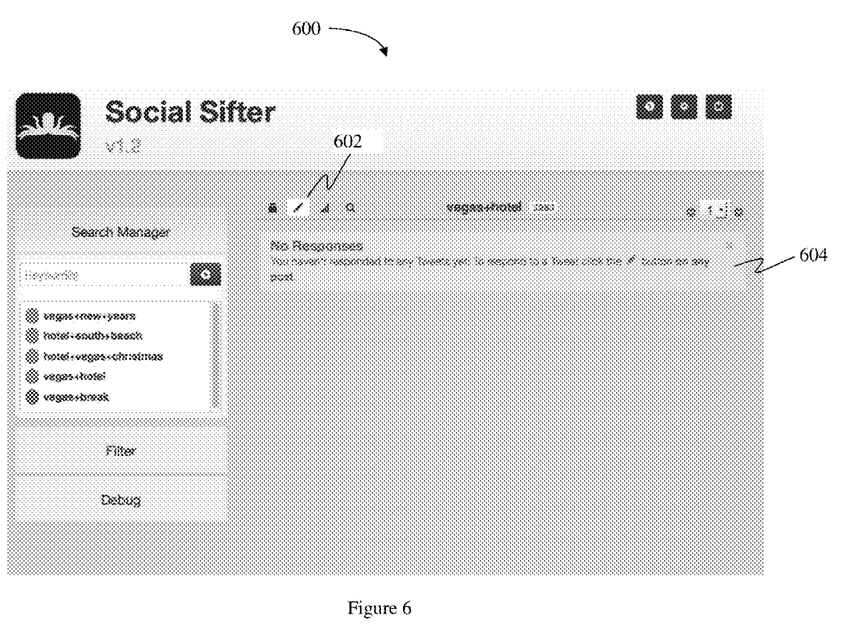
FIG. 6 is a screenshot of the user interface showing a response module.

Referring now to FIG. 6, there is shown a screenshot of the user interface 300 showing a response selector 602. The user interface 300 can further comprise a response selector 602. The response selector 602 can be used with one or more than one search result to construct a manual response 604 to selected social media posts. The manually constructed response 604 can be stored in the database 102 and used as one of the dynamically generated messages for a particular set of criteria that can also be stored in the database 102.

Figure 7:
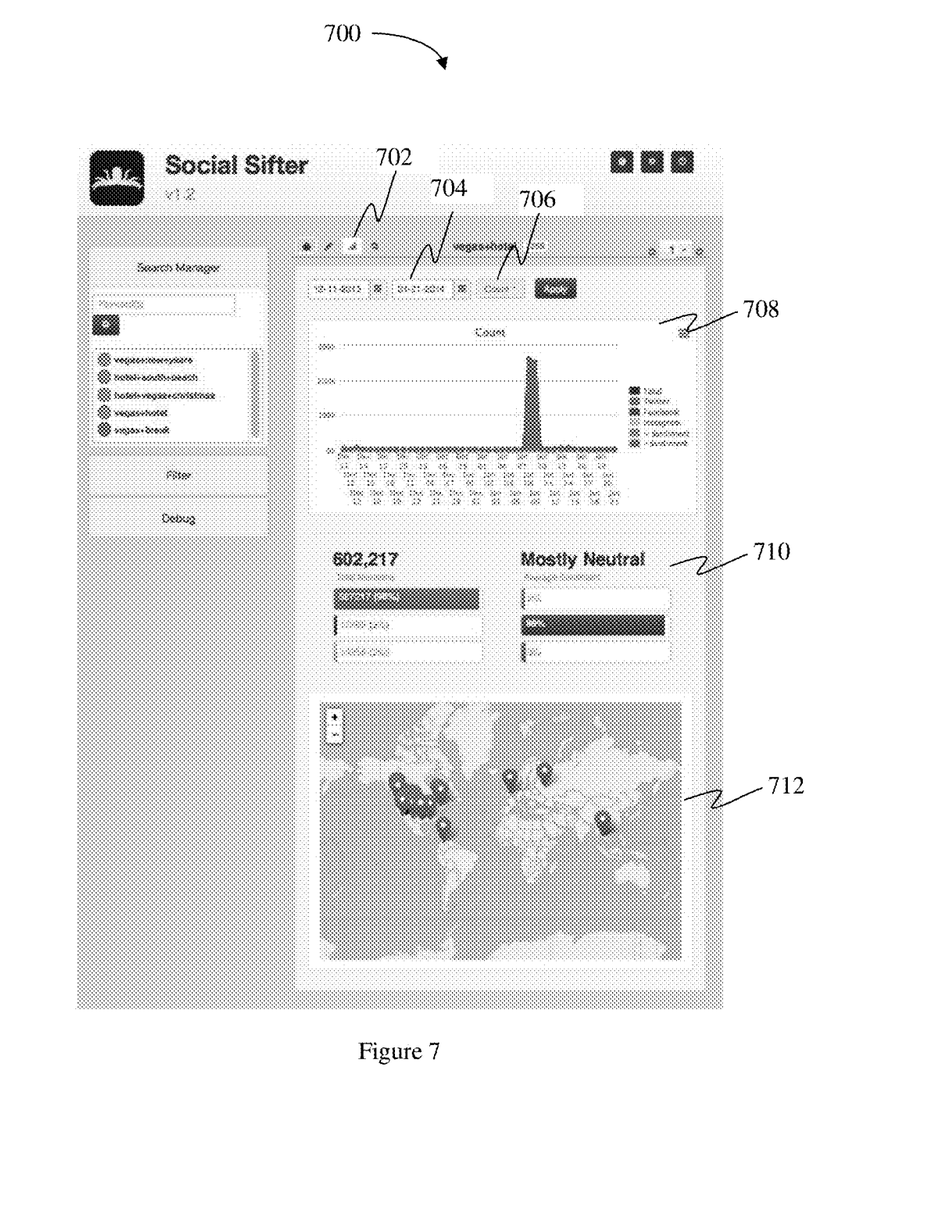
FIG. 7 is a screenshot of the user interface showing a chart of potential customer demographics.

Referring now to FIG. 7, there is shown a screenshot of the user interface 300 showing a charting module 702. The charting module 702 can comprise a chart selection module (not shown) a date range 704 module and a chart label selector 706. The chart selection 702 module can contain charts selected from the group consisting of a pie chart, a bar chart, a Pareto chart, a funnel chart, a histogram, a timeline chart and an area chart. The selected chart 708 can be displayed along with additional data, such as, for example, customer affinity 710 and a geo-location map 712 and the label selected using the chart label selector 706. As can be appreciated, the possibilities are fairly limitless and the selection of charts above is not intended to be limiting as marketing modules and transaction processing modules will change over time and the system 100 is adaptable to those changes.

Figure 8:
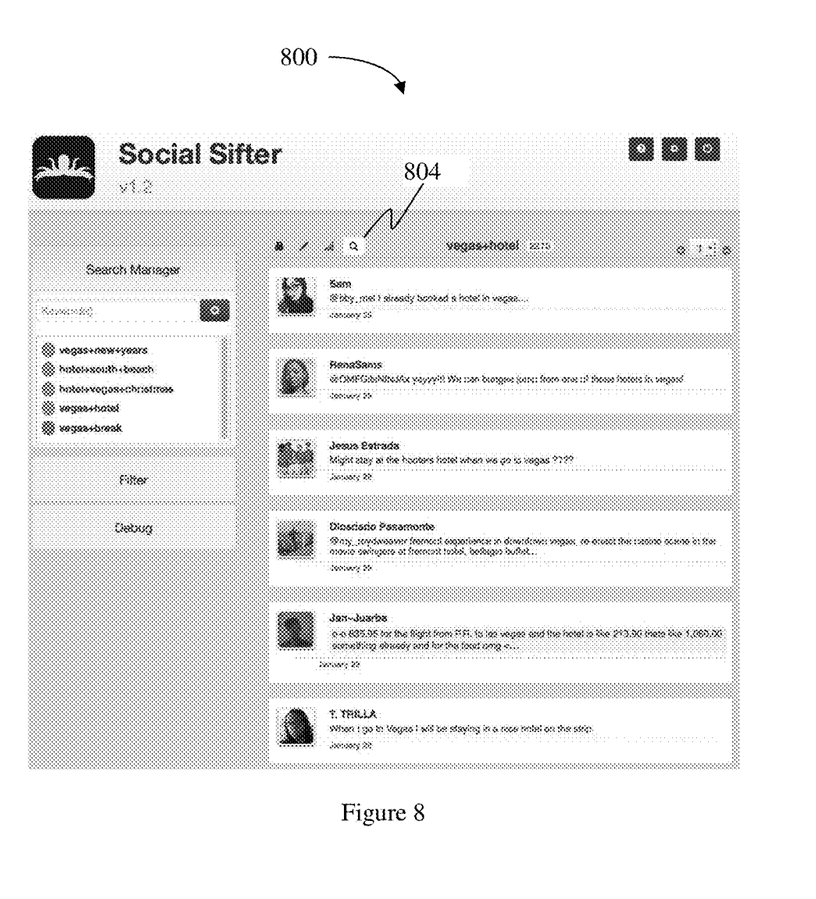
FIG. 8 is a screenshot of the user interface showing a search interface for locating potential customers on social media.

Referring now to FIG. 8, there is shown a screenshot of the user interface 300 showing a search interface 802 for locating potential customers on social media. The user interface 300 can further comprise a search interface 802. The search interface 802 can be used to return to top level search results returned from the search manager 304 module and the search box 306 when selected by the user.

Figure 9:
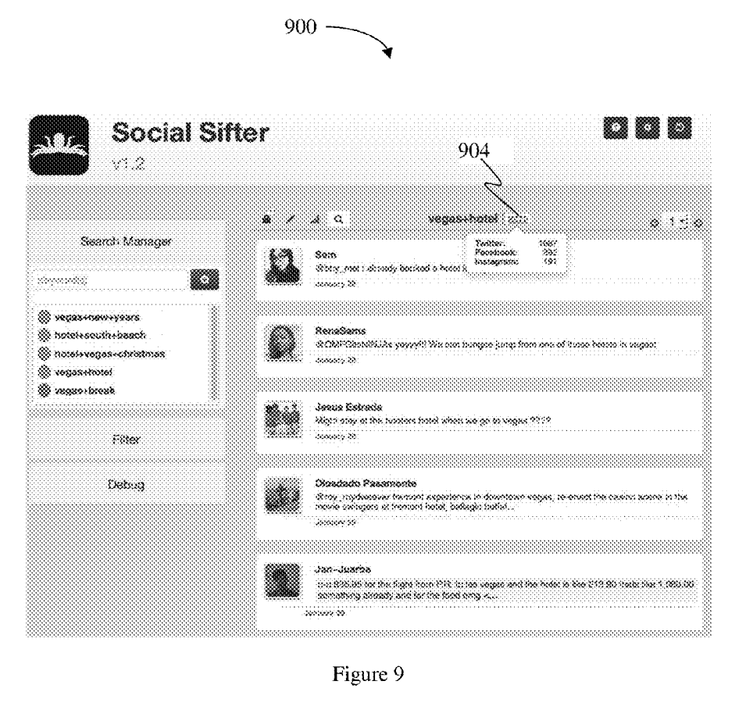
FIG. 9 is a screenshot of the user interface showing a breakdown of potential customer by social media website.

Referring now to FIG. 9, there is shown a screenshot of the user interface 300 showing a breakdown of search results by social media website 902. The user interface 300 can further comprise a breakdown of search results by social media website 902. The a breakdown of search results by social media website 902 dialog can show the number of posts that matched the search criteria returned by the search manager 204 module. This provides a quick view of the number of potential customers for the user's products or services. Also, it can provide a display of the social media site where the user can concentrate sales efforts. Additionally, it can be used to determine if the search criteria was too broad or too narrow for a particular social media site.

Figure 10:
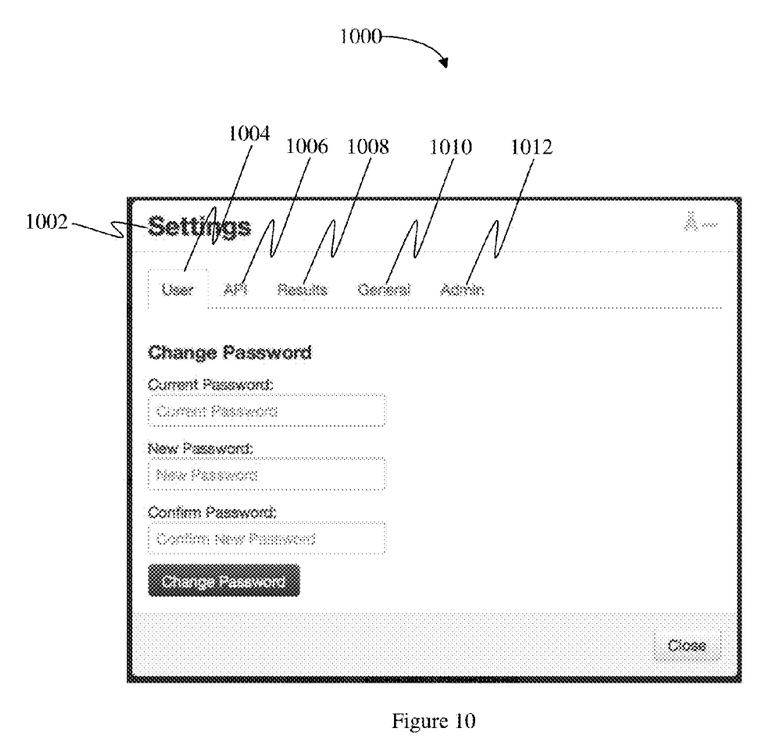
FIG. 10 is a screenshot of the user interface showing customizable system settings for a user.

Referring now to FIG. 10, there is shown a screenshot of the user interface 300 showing customizable system settings 1002 for a user. In this embodiment the settings include a user password module 1004, an API settings module 1006, a results settings module 1008, a general settings module 1010, and an administrative settings module 1012. As can be appreciated, each of these modules can be tailored to a specific user's marketing and sales criteria, so each of these modules can be reprogrammed to adjust for different circumstances.

Figure 11:
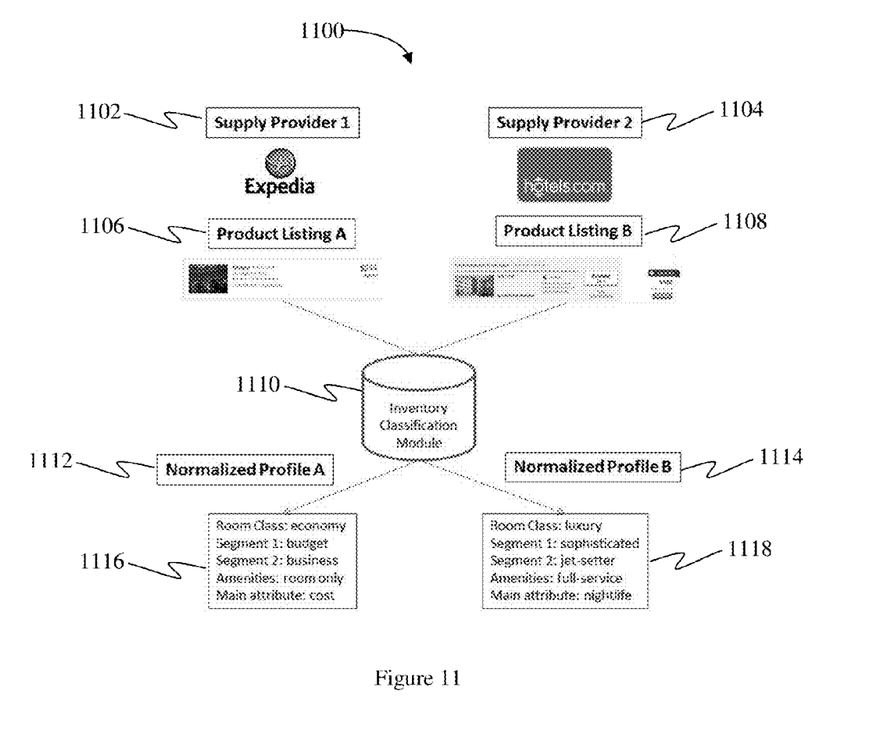
FIG. 11 is a diagram of an inventory classification module useful in the system of FIG. 1.

Referring now to FIG. 11, there is shown a diagram of an inventory classification module 1100 useful in the system of FIG. 1. The inventory classification module 1100 (ICM) can evaluate one or more than one third party descriptions of inventory and processes the information to classify the inventory descriptions into system defined terms to facilitate matching. The ICM 1100 transforms the "supply" in terms common to the "demand" and normalizes evaluations between a plurality of third party sources.

The ICM 1100 first retrieves data on products available 1102 and 1104 for matching using an application program interface (API), structured data feeds, data files, submission forms, manual entry or any other data ingestion methods know now or in the future. Then, the ICM 1100 executes non-transitory instructions on a processor to apply business logic to evaluate descriptions 1106 and 1108 and other stated attributes of a product or a service compiling an inventory.

Next, the ICM 1110 assigns a standard system value for the attributes of the product or the service based on proprietary taxonomy and other classification methods. Then, the ICM 1100 indexes normalized descriptions 1112 and 1114 of the inventory and stores the results in a database 1110. Next, the stored results can be used to match product supply with demand 1116 and 1118 using an automated means, a manual means or both an automated means and a manual means using the other system 100 modules (e.g. social search, lead analysis, customer engagement and blog integration).

What has been described is a new and improved system and method for a system to match product supply with demand by identifying potential customers on social media and determining buying intent of each potential customer, overcoming the limitations and disadvantages inherent in the related art.

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. §112.

What is claimed is:

1. A system to match product supply with demand using social media, the system comprising:
   a database; and,
   a plurality of processors each communicatively coupled to said database;
   wherein said plurality of processors comprise a first processor, a second processor, a third processor, a fourth processor and a fifth processor;
   wherein said first processor comprises a social search code segment that comprises non-transitory instructions, wherein the first processor comprising the social search code segment is configured to analyze keywords entered by users of social media, wherein the social search code segment is further configured to store the entered keywords in the database and generate customer leads of users seeking products, services or both products and services based on the analysis of keywords;
   wherein the second processor comprises a lead analysis code segment that comprises non-transitory instructions, wherein the second processor comprising the lead analysis code segment is configured to rank customer leads generated by the social search code segment;

wherein the third processor comprises a customer engagement code segment that comprises non-transitory instructions, wherein the third processor comprising the customer engagement code segment is configured to generate a message associated with the customer leads, the generated message being based on user defined templates, customer demographics and user activity history of the corresponding users, the message being indicative of a demand for a product;

wherein the fourth processor comprises a transaction code segment that comprises non-transitory instructions, wherein the fourth processor comprising the transaction code segment is configured to generate buying affinity based landing pages and interfaces embedded within social media based on the message generated by the customer engagement code segment;

wherein the fifth processor comprises a blog integration code segment that comprises non-transitory instructions, wherein the fifth processor comprising the blog integration code segment is configured to link the transaction code segment with a third party vendor; and, wherein the sixth processor comprises an inventory classification code segment that comprises non-transitory instructions, wherein the sixth processor comprising the inventory classification code segment is configured to retrieve product inventory information from the third party vendor, wherein the product inventory information is indicative of a product supply, and wherein sixth processor comprising the inventory classification code segment is further configured to match the demand for product with the product supply;

wherein each of said plurality of processors are communicatively connected to one another via one or more of HTTPS, HTTP POST, AJAX, JSON, XML, REST, SQL queries and direct database access, wherein each of said plurality of processors are coupled to one another by exchanging, storing and retrieving data between each of said plurality of processors and said database, wherein said database stores information from each of said plurality of processors, wherein the fourth processor further comprises a shopping cart code segment and a user interface, wherein the user interface displays various formats to a customer using customer affinity determined by the engagement code segment, wherein the third processor analyzes the information stored in said database and further refines a likelihood of the customer's intent to purchase the products, services or both products and services, and wherein the plurality of processors
  track how the customer visits and leaves a site before purchasing as additional information,
  collect said additional information to determine when the customer is considering a purchase,
  analyze said additional information to indicate the customer's intent,
  determine a trajectory of how the customer's search is progressing from said additional information, and
  dynamically generate further messages from said analysis of said additional information and said trajectory, wherein said further messages are specific to offers, availability or price of the products, services or both the products and services to convert the customer into a buyer.

2. The system of claim 1, wherein each processor of said plurality of processors is a discrete processor remotely located from each other.

3. The system of claim 1, wherein the first processor is further configured to analyze the keywords using the non-transitory instructions thereof, wherein said non-transitory instructions comprise one or more of natural language processing algorithms, statistical methods of classification and assignment of taxonomy categories.

4. The system of claim 1, wherein the second processor is further configured to rank the customer leads using the non-transitory instructions thereof, wherein said non-transitory instructions comprise one or more of Bayesian classifiers and Naive Bayesian classifiers.

5. The system of claim 1, wherein said plurality of processors dynamically generate said further messages in response to a social media post based on available information and attributes to engage said customer.

6. The system of claim 1, wherein the user activity history further includes a previous post analysis attribute and a previous customer interaction attribute.

7. The system of claim 6, wherein the previous customer interaction attribute is stored in the database.

8. The system of claim 6, wherein the previous customer interaction attribute is determined and classified from a customer profile on one or more than one social media website.

9. The system of claim 5, wherein the generated message comprises a unique Universal Resource Locator (URL) that links the customer to the transaction code segment.

10. The system of claim 9, wherein the generated message comprises an interface customized to a specific buying affinity, demographic and request.

11. The system of claim 1, wherein the non-transitory instructions of said plurality of processors define, store and retrieve attributes pertaining to customers in the database.

12. The system of claim 11, wherein the stored attributes comprises demographics, product affinity, products, and customer interaction with the system over time.

13. The system of claim 1, wherein the transaction code segment comprises additional interfaces to connect to proprietary third party product supply interfaces.

14. The system of claim 1, wherein the fourth processor comprising the transaction code segment further comprises instructions to support interfaces branded to a specific merchant.

15. The system of claim 1, wherein the fourth processor is further configured to generate analytics, display reports, display user created landing pages, integrate with additional social media platforms and integrate with third-party product platforms.

16. The system of claim 1, wherein the first processor is further configured to search various social media sites using keywords entered by the users.

17. The system of claim 1, wherein the second processor is further configured to rank the strength of the customer leads using an algorithm.

18. The system of claim 17, wherein the algorithm comprises one or more of of Bayesian Classifiers, Semantic Classifiers, and natural language processing.

19. The system of claim 1, wherein the third processor is further configured to communicate with the customer leads and transmit product related offers to the customer leads.

20. The system of claim 1, wherein the fourth processor is further configured to operate as a standalone website, a landing page, or within the social media.

21. The system of claim 1, wherein the fifth processor is further configured to insert the transaction code segment into third party web sites and blogs through keyword linking.

22. The system of claim 1, wherein the fifth processor is further configured to automatically convert keywords stored in the database to HTML anchors with hover-overs, tool-tip type balloons or both hover-overs and tool-tip type balloons in the third-party website.

23. The system of claim 22, wherein the hover-overs and tool-tip type balloons comprises customer incentives to purchase, where the incentives are a text, an image and a video.

24. The system of claim 1, wherein the fourth processor is further configured to accept input from the user to perform a search for keywords related to the products, services or both the products and services via the user interface, wherein results of the search are stored in the database and displayed in a quick list.

25. The system of claim 24, wherein the user interface comprises a filter button, wherein the fourth processor is further configured to
accept a second input from the user to click the filter button to filter the results,
accept a third input from the user to select specific customers to save or send said dynamically generated further messages.

26. The system of claim 1, wherein the user interface comprises a plurality of functional areas comprising a settings component, a search manager component, a filter box component, a page selector and a post listing component, wherein the search manager component comprises a search box and a list box, wherein the search box provides the user an area to enter keywords to search through social media posts that are relevant one or more of the products and services that the user has to offer for sale, and wherein the list box comprises previous searches that the user has conducted and saved in the database.

27. The system of claim 26, wherein the previous searches are used to automatically generate the dynamically generated further message on a daily basis to new potential customers that are not stored in the database.

28. The system of claim 1, wherein the sixth processor is further configured to evaluate one or more third party descriptions of inventory, process the inventory descriptions to classify the inventory descriptions into system defined terms to facilitate matching, transform the supply in terms common to the demand and normalize evaluations between a plurality of third party sources.

29. The system of claim 1, wherein the sixth processor is further configured to
retrieve data on one or more of the products and services available for matching using one or more of an application program interface (API), structured data feeds, data files, submission forms, and manual entry,
apply business logic to evaluate one or more third party descriptions and other stated attributes of one or more of the products and services compiling an inventory,
assign a standard system value for the attributes of one or more of the products and services based on proprietary taxonomy and other classification methods,
index normalized descriptions of the inventory, and
store the results in the database,
wherein the results stored in the database are used to match the demand for product with the product supply using one or more of an automated method and a manual method the first processor, the second processor, the third processor the fifth processor.

* * * * *

UNITED STATES PATENT AND TRADEMARK OFFICE
CERTIFICATE OF CORRECTION

| | | |
|---|---|---|
| PATENT NO. | : 9,852,477 B2 | Page 1 of 1 |
| APPLICATION NO. | : 14/192358 | |
| DATED | : December 26, 2017 | |
| INVENTOR(S) | : Michael C. Palmer and Steven A. Tulk | |

It is certified that error appears in the above-identified patent and that said Letters Patent is hereby corrected as shown below:

In the Claims

Column 13, Line 34, Claim 26, replace "that are relevant one or more of the products" with --that are relevant to one or more of the products--.

Signed and Sealed this
Sixth Day of February, 2018

Joseph Matal
*Performing the Functions and Duties of the
Under Secretary of Commerce for Intellectual Property and
Director of the United States Patent and Trademark Office*